United States Patent
Jun et al.

(10) Patent No.: US 7,570,464 B2
(45) Date of Patent: Aug. 4, 2009

(54) OVERLOAD PROTECTIVE APPARATUS OF A COMPRESSOR AND A METHOD THEREOF

(75) Inventors: Young-Hoan Jun, Changwon (KR); Dong-Hee Shin, Busan (KR); Gyoo-Jong Bae, Gyeongsangnam-Do (KR); Woo Geun Lee, Busan (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/498,099

(22) PCT Filed: Oct. 11, 2002

(86) PCT No.: PCT/KR02/01910

§ 371 (c)(1),
(2), (4) Date: Jun. 10, 2004

(87) PCT Pub. No.: WO2004/033909

PCT Pub. Date: Apr. 22, 2004

(65) Prior Publication Data

US 2005/0083630 A1 Apr. 21, 2005

(51) Int. Cl.
  *H02H 7/00* (2006.01)
(52) U.S. Cl. .................................... 361/22
(58) Field of Classification Search ............... 361/22
  See application file for complete search history.

(56) References Cited

U.S. PATENT DOCUMENTS

| | | | |
|---|---|---|---|
| 3,721,880 A * | 3/1973 | Neill | 318/471 |
| 3,742,303 A * | 6/1973 | Dageford | 361/22 |
| 4,514,989 A * | 5/1985 | Mount | 62/201 |
| 4,617,472 A * | 10/1986 | Slavik | 307/9.1 |
| 5,182,459 A * | 1/1993 | Okano et al. | 307/10.1 |
| 5,209,075 A * | 5/1993 | Kim | 62/126 |
| 5,349,162 A * | 9/1994 | Holling | 219/445.1 |
| 5,414,989 A * | 5/1995 | Rader et al. | 57/339 |
| 5,631,796 A * | 5/1997 | Yoshihara et al. | 361/79 |
| 5,986,597 A * | 11/1999 | Stemporzewski et al. | 341/142 |
| 6,158,230 A * | 12/2000 | Katsuki | 62/126 |
| 6,176,683 B1 * | 1/2001 | Yang | 417/44.1 |
| 6,550,870 B1 * | 4/2003 | Goodzey | 303/9 |

(Continued)

FOREIGN PATENT DOCUMENTS

DE  24 29 279 C2  1/1975

(Continued)

*Primary Examiner*—Stephen W Jackson
*Assistant Examiner*—Ann T Hoang
(74) *Attorney, Agent, or Firm*—Birch, Stewart, Kolasch & Birch, LLP

(57) ABSTRACT

In an overload protective apparatus of a compressor and its method capable of preventing damage of a compressor due to overload by removing an overload protector and using an operation control device operating the compressor, the overload protective apparatus includes a reference current setting unit for presetting a reference current value for operating the compressor normally; a microcomputer for generating a power cutoff signal when the detected current value is greater than the reference current value and generating a power supply signal when the detected current value is smaller than the reference current value; and a power supply unit for cutting off power applied to the compressor on the basis of the power cutoff signal or applying power to the compressor on the basis of the power supply signal.

7 Claims, 3 Drawing Sheets

U.S. PATENT DOCUMENTS

2005/0015125 A1 * 1/2005 Mioduski et al. ............ 607/102

FOREIGN PATENT DOCUMENTS

| DE | 43 33 591 A1 | | 4/1995 |
| --- | --- | --- | --- |
| DE | 101 47 610 A1 | | 6/2002 |
| EP | 1 100 190 A2 | | 5/2001 |
| JP | 57194858 A | * | 11/1982 |
| JP | 62-103492 A | | 5/1987 |
| JP | 1-281353 | * | 11/1989 |
| JP | 3-28650 | * | 2/1991 |
| JP | 5-18588 A | | 1/1993 |
| JP | 7-158931 | * | 6/1995 |
| JP | 9-112438 A | | 5/1997 |
| JP | 10-122141 A | | 5/1998 |
| JP | 11-351143 A | | 12/1999 |
| JP | 13-204180 A | | 7/2001 |
| JP | 14-22237 A | | 1/2002 |
| JP | 2002-235673 A | | 8/2002 |

* cited by examiner

OVERLOAD PROTECTIVE APPARATUS OF A COMPRESSOR AND A METHOD THEREOF

TECHNICAL FIELD

The present invention relates to a compressor, and particularly, to an overload protective apparatus of a compressor and its method capable of preventing a compressor for being damaged by overload without using an over load protector (OLP).

BACKGROUND ART

In general, a compressor, particularly, a reciprocating compressor has no crankshaft for converting a rotating movement to a linear movement, thereby having small friction loss and so having higher efficiency in compression than that of a general compressor.

In case that the reciprocating compressor is used for a refrigerator or an air conditioner, as a stroke voltage inputted to the reciprocating compressor is varied, a compression ratio of the reciprocating compressor can be varied to control freezing compressor. Such a reciprocating compressor will now be described with reference to FIG. 1.

FIG. 1 is a block diagram showing a structure of an operation control device of the reciprocating compressor in accordance with the conventional art.

As shown therein, the operation control device of the reciprocating compressor includes: a voltage detecting unit 14 for detecting a voltage applied to the reciprocating compressor 13 as the compressor operates; a current detecting unit 12 for detecting a current applied to the reciprocating compressor 13 as the compressor operates; a microcomputer 15 for calculating a stroke by using the voltage detected by the voltage detecting unit 14 and the current detected by the current detecting unit 12, comparing the calculated stroke and a stroke reference value, and outputting a switching control signal on the basis of the comparison result; and a power supply unit 11 for supplying a stroke voltage to the reciprocating compressor 13 by on-off controlling AC power supplied to the reciprocating compressor 13 according to the switching control signal outputted from the microcomputer 15 by using an internal triac (Tr1). Herein, the reciprocating compressor 13 receives a stroke voltage provided to an internal motor (not shown) according to a stroke reference value set by a user and varies an internal stroke so as to vertically move a piston (not shown) in the compressor.

Hereinafter, operations of the operation control device of a reciprocating motor compressor in accordance with the conventional art will now be described.

First, the reciprocating motor compressor 13 receives a voltage supplied to the motor on the basis of the stroke reference value set by a user and varies the stroke so as to vertically move the stroke. Herein, the stroke means a moving distance of a piston in the reciprocating motor compressor 13 in a reciprocating movement.

A turn-on period of the triac (Tr1) of the power supply unit 11 is lengthened by a switching control signal outputted from the microcomputer 15. As the turn-on period is lengthened, the AC power is supplied to the reciprocating motor compressor 13 to drive the reciprocating motor compressor 13. At this time, the voltage detecting unit 14 and the current detecting unit 12 detect a voltage and a current applied to the reciprocating motor compressor 13 and output the detected voltage and current to the microcomputer 15, respectively.

The microcomputer 15 calculates a stroke by using the voltage and the current detected by the voltage detecting unit 14 and the current detecting unit 12, then, compares the calculated stroke with the stroke reference value, and outputs a switching control signal according to the comparison result. That is, when the calculated stroke is smaller than the stroke reference value, the microcomputer 15 outputs a switching control signal for lengthening an on-period of the triac (Tr1) to the power supply unit 11 thereby increasing a stroke voltage supplied to the reciprocating motor compressor 13.

On the other hand, when the calculated stroke is greater than the stroke reference value, the microcomputer 15 outputs a switching control signal for shortening an on-period of the triac (Tr1) to the power supply unit 11 thereby decreasing a stroke voltage supplied to the reciprocating motor compressor 13.

In the conventional art, an over load protector (OLP) 20 for cutting off power applied to. a motor of the compressor 13 when a temperature of the compressor 13 is high or when over current flows in a internal motor of the compressor 13, is installed independent of the operation control device.

Hereinafter, an over load protector (OLP) in accordance with the conventional art will now be described.

The over load protector 20 detects a temperature of a compressor 13 electrically connected with itself. In addition, the over load protector 20 detects heat due to a current flowing therein, and cuts off or passes power applied to an internal motor of the compressor 13 on the basis of a temperature of the detected heat. That is, when a temperature of the compressor 13 gets high, or over current flows in the internal motor of the compressor 13, the over load protector 20 operates to cut off power supplied to the compressor 13, and thus prevents damage of the compressor 13.

However, the over load protector installed in the compressor 13 in accordance with the conventional art cannot be minimized by a size of a power device (not shown) in the over load protector 20, and also, a cost for the compressor increases by installing the over load protector in the compressor.

DISCLOSURE OF THE INVENTION

Therefore, it is an object of the present invention to provide an overload protective apparatus and its method capable of preventing damage of a compressor due to overload by using an operation control device operating the compressor without using the overload protector.

To achieve the above object, there is provided an overload protective apparatus of a compressor including: a reference current setting unit for presetting a reference current value for normally operating a compressor; a current detecting unit for detecting a current applied to the compressor; a microcomputer for generating a power cutoff signal when the detected current value is greater than the reference current value, and for generating a power supply signal when the detected current value is smaller than the reference current value; and a power supply unit for cutting off power applied to the compressor on the basis of the power cutoff signal, or for applying power to the compressor on the basis of the power supply signal.

To achieve the above object, there is provided an operation control device of a compressor including a voltage detecting unit for detecting a voltage applied to a compressor; a current detecting unit for detecting a current applied to the compressor; a microcomputer for calculating a stroke by using a voltage detected by the voltage detecting unit and a current detected by the current detecting unit, comparing the calculated stroke and a stroke reference value and outputting a switching control signal on the basis of the comparison result;

and a power supply unit for supplying a stroke voltage to the compressor by on-off controlling AC power supplied to the compressor on the basis of the switching control signal outputted from the microcomputer by using an internal triac (Tr1), further comprising: a reference current setting unit for presetting a reference current value of the compressor; a microcomputer for generating a power cutoff signal when the detected current value is greater than the reference current value and outputting the generated power cutoff signal or for generating a power supply signal when the detected current value is smaller than the reference current value and outputting the generated power supply signal; and a switching unit for cutting off power applied to the internal motor of the compressor on the basis of the power cutoff signal, or for applying power to the internal motor of the compressor on the basis of the power supply signal.

To achieve the above object, there is provided a method for protecting a compressor from overload comprising: detecting a current applied to a compressor; comparing the detected current value and a pre-stored reference current value; generating a power cutoff signal when the detected current value is greater than the reference current value, and generating a power supply signal when the detected current value is the same as or smaller than the reference current value; and cutting off power applied to an internal motor of the compressor on the basis of the power cutoff signal or applying power to the internal motor of the compressor on the basis of the power supply signal.

To achieve the above object, there is provided a method for controlling operation of a compressor including detecting a voltage and a current applied to a compressor; calculating a stroke by using the voltage and the current; comparing the calculated stroke and a stroke reference value; and controlling an operation of the compressor on the basis of the comparison result, further comprising: comparing the detected current value and a pre-stored reference current value; generating a power cutoff signal when the detected current value is greater than the reference current value, and generating a power supply signal when the detected current value is the same as or smaller than the reference current value; and cutting off power applied to an internal motor of the compressor on the basis of the power cutoff signal, or applying power to the internal motor of the compressor on the basis of the power supply signal.

MODES FOR CARRYING OUT THE PREFERRED EMBODIMENTS

Hereinafter, there will be described in detail with reference to FIGS. 2 through 4, a preferred embodiment of an overload protective apparatus and its method capable of preventing damage of a compressor due to overload, by using an operation control apparatus for controlling an operation of the compressor, without using an over load protector.

Figure 1:
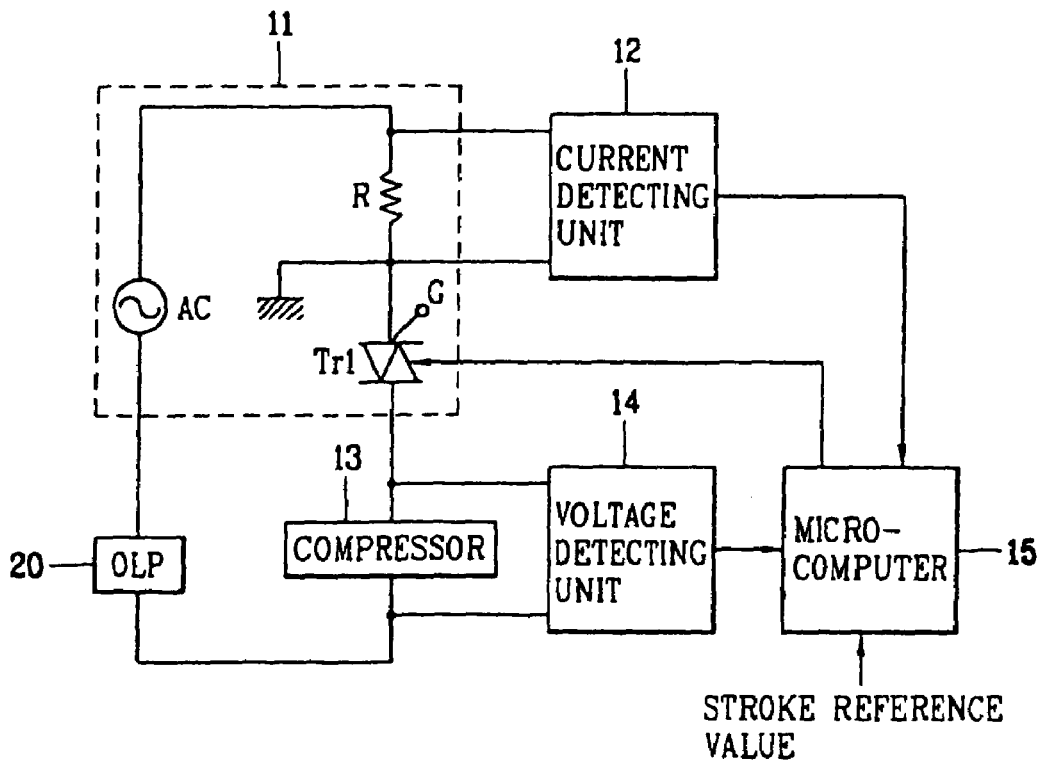
FIG. 1 is a block diagram showing a structure of an operation control device of a reciprocating compressor in accordance with the conventional art.
Figure 2:
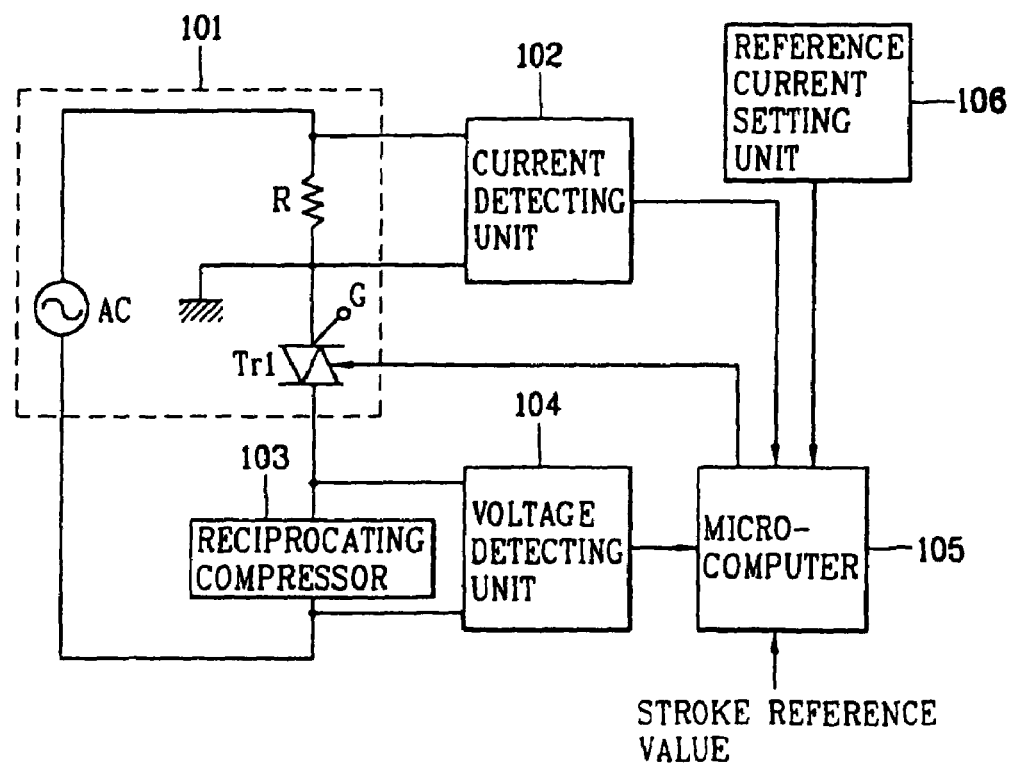
FIG. 2 is a block diagram showing a structure of an operation control device and an overload protective apparatus of a reciprocating compressor in accordance with the present invention.

FIG. 2 is a block diagram showing a structure of an operation control device and an overload protective apparatus of a reciprocating compressor in accordance with the present invention.

As shown therein, an operation control device of the reciprocating compressor includes: a voltage detecting unit 104 for detecting a voltage applied to the reciprocating compressor 103 as a piston in the reciprocating compressor is driven; a current detecting unit 102 for detecting a current applied to the reciprocating compressor 103 as a piston in the compressor is driven; a microcomputer 105 for calculating a stroke by using the voltage detected by the voltage detecting unit 104 and the current detected by the current detecting unit 102, comparing the calculated stroke and a stroke reference value, and outputting a switching control signal on the basis of the comparison result; and a power supply unit 101 for supplying a stroke voltage to the reciprocating compressor 103 by turning on/off AC power supplied to the reciprocating compressor 103 according to a switching control signal outputted from the microcomputer 105 by using an internal triac (Tr1).

In addition, the overload protective apparatus in accordance with the present invention includes: the current detecting unit 102, the microcomputer 105, the power supply unit 101 and a reference current setting unit 106 for presetting a reference current for normally operating a motor in the compressor. Herein, when a detected current value is greater than the reference current value, the microcomputer 105 generates a power cutoff signal and outputs the generated power cutoff signal, when the detected current value is smaller than the reference current value, the microcomputer 105 generates a power supply signal and outputs the generated power supply signal. In addition, the power supply unit 101, cuts off power applied to an internal motor of the compressor 103 on the basis of the power cutoff signal, or applies power to the internal motor of the compressor 103 on the basis of the power supply signal.

Operations of the overload protective apparatus in accordance with the present invention will now be described in detail with the same operations as the conventional operation control device omitted since the present invention is about an overload protective apparatus and its method capable of preventing damage of a compressor due to overload.

First, when a compressor 103 operates, the current detecting unit 102 of the overload protective apparatus detects a current applied to an internal motor of the compressor in real time, and outputs the detected current value to the microcomputer 105.

When a current value detected by the current detecting unit 102 is greater than a reference current value preset in the reference current setting unit 106, the microcomputer 105 generates a power cutoff signal, and outputs the generated power cutoff signal to the power supply unit 101. But when a current value detected by the current detecting unit 102 is the same as or smaller than a reference current value preset in the reference current setting unit 106, the microcomputer 105 generates a power supply signal, and outputs the generated power supply signal to the power supply unit 101.

Thereafter, the triac (Tr1) of the power supply unit 101 cuts off power applied to an internal motor of the compressor 103 on the basis of the power cutoff signal, or applies power to the internal motor of the compressor 103 on the basis of the power supply signal. That is, the triac (Tr1) of the power supply unit 101 controls a turn-on period on the basis of the power supply signal or the power cutoff signal outputted from the microcomputer 105, to cut off or pass power applied to the internal motor of the compressor 103.

Hereinafter, a structure of a different embodiment of the overload protective apparatus of the reciprocating compressor in accordance with the present invention will now be described in detail with reference to FIG. 3.

Figure 3:
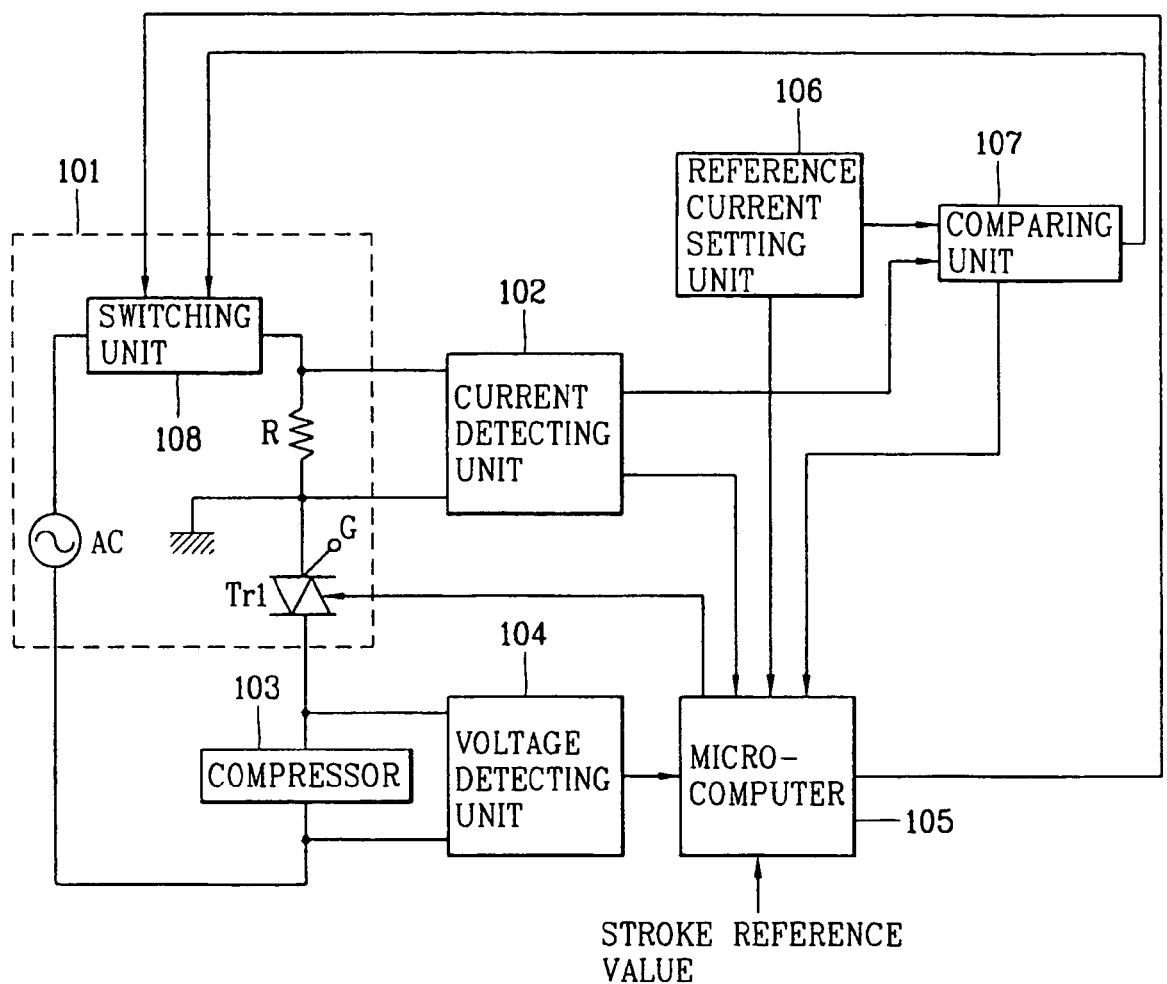
FIG. 3 is a block diagram showing a structure of a different embodiment of an overload protective apparatus of a reciprocating compressor in accordance with the present invention.

FIG. 3 is a block diagram showing a structure of a different embodiment of an overload protective apparatus of a reciprocating compressor in accordance with the present invention.

As shown therein, an overload protective apparatus in accordance with the different embodiment of the present invention includes: a reference current setting unit 106 for pre-storing a reference current value; a current detecting unit 102 for detecting a current applied to an internal motor (not shown) of the compressor when the compressor 103 operates; a microcomputer 105 for generating a power cutoff signal when a current value detected by the current detecting unit 102 is greater than the reference current value stored in the reference current setting unit 106 and outputting the generated power cutoff signal, or for generating a power supply signal when the detected current value is the same as or smaller than the reference current value and outputting the generated power supply signal; and switching unit 108 for cutting off power applied to the internal motor of the compressor 103 on the basis of the power cutoff signal, or for applying power to the internal motor of the compressor 103 on the basis of the power supply signal.

In addition, the overload protective apparatus of the reciprocating compressor in accordance with the difference embodiment of the present invention further includes a comparing unit 107 which is driven independent of the microcomputer 105 when the microcomputer 105 does not operate. That is, the comparing unit 107 compares a current value detected by the current detecting unit 102 and a reference current value pre-stored in the reference current setting unit 106, generates a power cutoff signal when the current value detected by the current detecting unit 102 is greater than the reference current value and outputs the generated power cut-off signal to the switching unit 108. When the detected current value is smaller than the reference current value, the comparing unit 107 generates a power supply signal and outputs the generated power supply signal to the switching unit 108.

Herein, the microcomputer 105 receives the power supply signal from the comparing unit 107 and controls a turn-on period of the triac (Tr1) in the power supply unit 101 thereby applying power to the internal motor of the compressor, or the microcomputer 105 receives the power cutoff signal from the comparing unit 107 and controls a turn-on period of the internal triac of the power supply unit 101 thereby cutting off power applied to the internal motor of the compressor 103.

In addition, in the overload protective apparatus of the reciprocating compressor in accordance with the difference embodiment of the present invention, if the comparing unit 107 does not operate because of a break down or the like, the power can be cut off or applied by an output signal of the microcomputer 105. That is, in case that the comparing unit 107 does not operate, the microcomputer 105 generates a power cutoff signal when a current detected by the current detecting unit 102 is greater than a reference current value pre-stored in the reference current setting unit 106 and outputs the generated power cutoff signal to the switching unit 108. When the detected current value is smaller than the reference current value, the microcomputer 105 generates a power supply signal and outputs the generated power supply signal to the switching unit 108.

In the present invention, there may be used a device for performing a contact/noncontact type mechanical operation, such as a relay (not shown), as the switching unit 108, in order to apply or cut off power applied to an internal motor of the compressor 103 on the basis of an output signal of the microcomputer 105 or the comparing unit 107.

Hereinafter, operations of the overload protective apparatus of the reciprocating compressor in accordance with the difference embodiment of the present invention will now be described with reference to FIG. 4.

Figure 4:
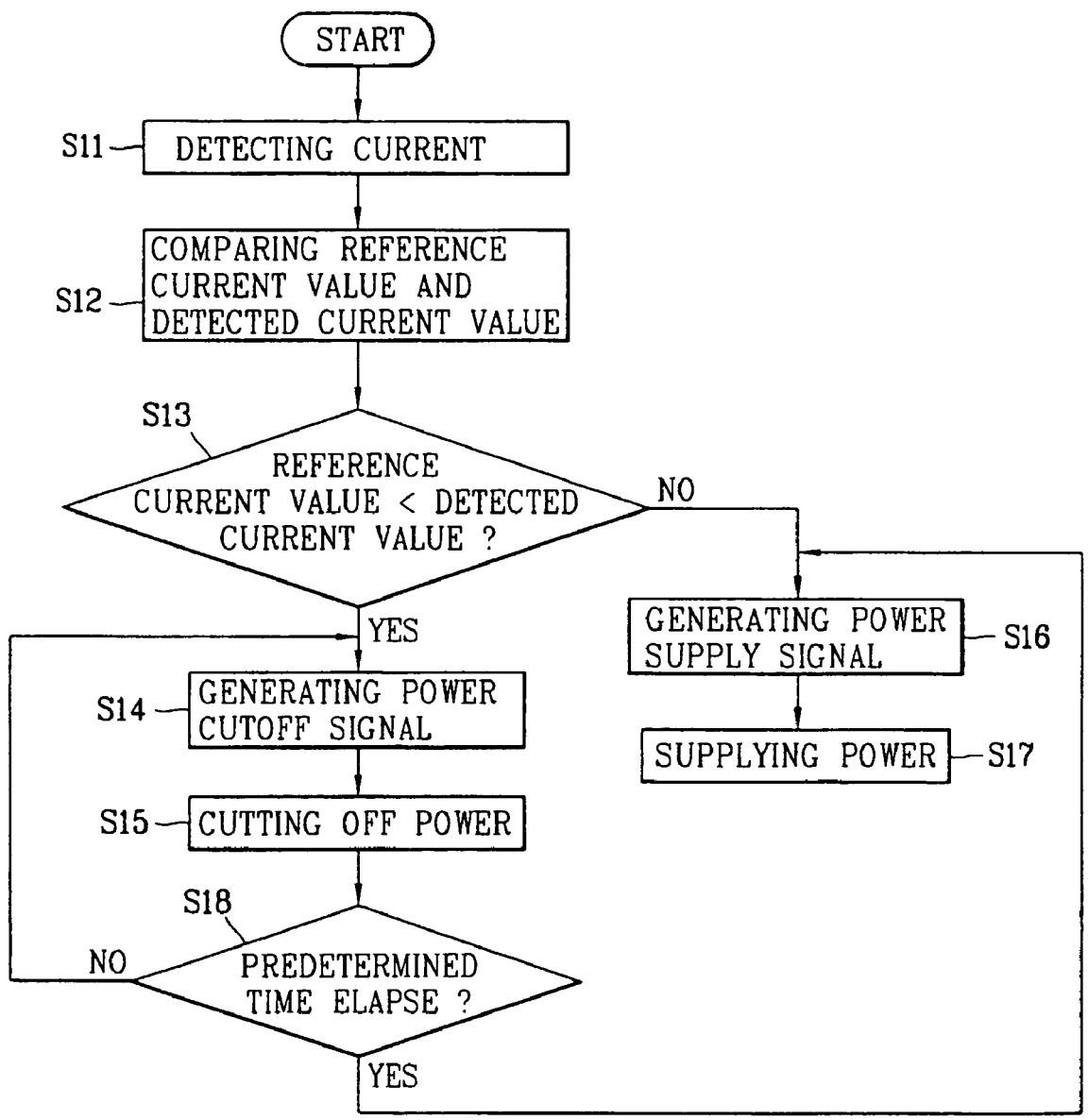
FIG. 4 is a flow chart showing an operational order of an overload protective apparatus of a reciprocating compressor in accordance with a different embodiment of the present invention.

FIG. 4 is a flow chart showing an operational order of an overload protective apparatus of a reciprocating compressor in accordance with the difference embodiment of the present invention.

First, the current detecting unit 102 detects a current applied to an internal motor of the compressor 103 when the compressor 103 operates, in real time (S11).

The microcomputer 105 generates a power cutoff signal when a current value detected by the current detecting unit 102 is greater than a reference current value stored in the reference current setting unit 102, and outputs the generated power cutoff signal to the switching unit 108 (S12~S14). At this time, the switching unit 108 cuts off power applied to the compressor on the basis of the power cutoff signal. That is, if over current is detected, the microcomputer 105 controls the switching unit 108 such as a relay to cut off power applied to a motor in the compressor 103 (S15).

On the other hand, the microcomputer 105 generates a power supply signal when the detected current value is the same as or smaller than the reference current value and outputs the generated power supply signal to the switching unit 108. At this time, the switching unit 108 applies power to the compressor 103 on the basis of the power supply signal. That is, if over current is not detected, the microcomputer 105 controls the switching unit 108 such as a relay to apply power to the motor in the compressor 103 and normally drives the compressor 103 (S16, S17).

In the overload protective apparatus of the reciprocating compressor in accordance with the different embodiment of the present invention, if the microcomputer 105 does not operate due to a break down or the like, the power can be cut off or applied by an output signal of the comparing unit 107. That is, the comparing unit 107 compares a reference current value pre-stored in the reference current setting unit 106 and a current value detected by the current detecting unit 102, generates a power cutoff signal when the current value detected by the current detecting unit 102 is greater than the reference current value, and outputs the generated power cutoff signal to the switching unit 108 (S12~S14). At this time, the switching unit 108 cuts off power applied to the compressor 103 on the basis of the power cutoff signal.

On the other hand, when the detected current value is the same as or smaller than the reference current value, the comparing unit 107 generates a power supply signal, and outputs the generated power supply signal to the switching unit 108. At this time, the switching unit 108 applies power to the compressor on the basis of the switching signal. Herein, the reference current value is preset by a user and means a current value that should be applied to an internal motor of the compressor 103 in order to normally drive the motor. That is, the reference current value is set in such a manner of measuring a current value applied to an internal motor of the compressor when the compressor normally operates and storing the measured value (S12~S13, 16).

The microcomputer 105 determines whether a predetermined time (e.g., 1~3 minutes) elapses after cutting off power applied to the compressor 103. If the predetermined time elapses, the microcomputer 105 generates the power supply signal, and outputs the generated power supply signal to the switching unit 108. At this time, the switching unit 108 applies power to the compressor 103 on the basis of the power supply signal so that the compressor 103 can normally operate.

On the other hand, if the predetermined time does not elapse, the microcomputer 105 generates the power cutoff signal, and outputs the generated power cutoff signal to the switching unit 108. At this time, the switching unit 108 cuts off power applied to the compressor 103 on the basis of the power cutoff signal (S18).

Accordingly, by using an operation control device for controlling an operation of the compressor 103 without using an over load protector (OLP), damage of the compressor 103 due to overload can be prevented.

As so far described, the present invention is advantageous in that damage of a compressor due to the over current can be prevented without using a conventional over load protector (OLP), by comparing a current value applied to an internal motor of a compressor when the compressor operates and the reference current value, and cutting off or applying power to the internal motor of the compressor on the basis of the comparison result.

In addition, the present invention is advantageous in that a cost can be reduced by using an operation control device for controlling an operation of the compressor, without using the conventional over load protector (OLP).

In addition, the present invention is advantageous in that the compressor can be minimized by using an operation control device for controlling an operation of the compressor, without using the conventional over load protector (OLP).

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. An overload protective apparatus of a compressor comprising:
   a reference current setting unit for pre-setting a reference current value for normally operating a compressor;
   a current detecting unit for detecting a current applied to the compressor;
   a comparing unit connected to the current detecting unit, the comparing unit receiving a detected current value of the current applied to the compressor from the current detecting unit and comparing the reference current value and the detected current value, the comparing unit generating a first power cutoff signal when the detected current value during operation of the compressor is greater than the reference current value and generating a first power supply signal when the detected current value is smaller than the reference current value;
   a microcomputer connected to the current detecting unit, the microcomputer receiving the detected current value of the current applied to the compressor from the current detecting unit and generating a second power cutoff signal when the detected current value during the operation of the compressor is greater than the reference current value, and for generating a second power supply signal when the detected current value is smaller than the reference current value, wherein the microcomputer receives the first power supply signal from the comparing unit and controls a turn-on period of a triac in a power supply unit to apply the power to an internal motor of the compressor, or receives the first power cutoff signal from the comparing unit and controls a turn-on period of an internal triac of the power supply unit to cut off the power applied to the internal motor of the compressor; and
   the power supply unit connected to the comparing unit and the microcomputer for receiving the first and second power cutoff signals and the first and second power supply signals, the power supply unit stopping supplying power to the compressor in response to at least one of the first and second power cutoff signals, the power supply unit supplying the power to the compressor in response to at least one of the first and second power supply signals, wherein the power supply unit stops supplying power to the compressor in response to either one of the first and second power cutoff signals, and the power supply unit supplies the power to the compressor in response to either one of the first and second power supply signals.

2. The apparatus of claim 1, wherein the power supply unit controls a turn-on period of an internal triac on the basis of the power cutoff signal to cut off power applied to an internal motor of the compressor, or controls a turn-on period of the internal triac on the basis of the power supply signal to apply power to the internal motor of the compressor.

3. The apparatus of claim 1, wherein the power supply unit further comprises a relay, wherein the relay cuts off power applied to the internal motor of the compressor on the basis of at least one of the first and second power cutoff signals or applies power to the internal motor of the compressor on the basis of at least one of the first and second power supply signals.

4. The apparatus of claim 1, wherein the power supply unit further comprises a device for performing a contact/noncontact type mechanical operation, wherein the device cuts off power applied to the internal motor of the compressor on the basis of at least one of the first and second power cutoff signals, or applies power to the internal motor of the compressor on the basis of at least one of the first and second power supply signals.

5. The apparatus of claim 1, wherein the power supply unit further comprises:
   an AC power source; and
   a switching unit connected to the comparing unit and the microcomputer for receiving the first and second power cutoff signals and the first and second power supply signals,
   wherein the switching unit, the internal triac, the compressor and the AC power source are connected in series.

6. An operation control device of a compressor, comprising:
   a voltage detecting unit for detecting a voltage applied to a compressor;
   a current detecting unit for detecting a current applied to the compressor;
   a microcomputer connected to the current detecting unit, the microcomputer receiving a detected current value of the current applied to the compressor from the current detecting unit and calculating a stroke by using a voltage detected by the voltage detecting unit and the detected current value detected by the current detecting unit, comparing the calculated stroke and a stroke reference value, and outputting a switching control signal on the basis of the comparison result;
   a power supply unit for supplying a stroke voltage to the compressor by on-off controlling AC power supplied to the compressor on the basis of the switching control signal outputted from the microcomputer by using an internal triac;

a reference current setting unit for presetting a reference current value of the compressor;

a comparing unit connected to the current detecting unit, the comparing unit receiving the detected current value from the current detecting unit and comparing the reference current value and the detected current value, the comparing unit generating a first power cutoff signal when the detected current value during the operation of the compressor is greater than the reference current value and generating a first power supply signal when the detected current value is smaller than the reference current value, the microcomputer generating a second power cutoff signal when the detected current value during operation of the compressor is greater than the reference current value, the microcomputer generating a second power supply signal when the detected current value is smaller than the reference current value, wherein the microcomputer receives the first power supply signal from the comparing unit and controls a turn-on period of a triac in the power supply unit to apply the power to an internal motor of the compressor, or receives the first power cutoff signal from the comparing unit and controls a turn-on period of an internal triac of the power supply unit to cut off the power applied to the internal motor of the compressor; and a switching unit connected to the comparing unit and the microcomputer for receiving the first and second power cutoff signals and the first and second power supply signals, the switching unit disconnecting the power supply unit from an internal motor of the compressor in response to at least one of the first and second power cutoff signals, the switching unit connecting the power supply unit to the internal motor of the compressor in response to at least one of the first and second power supply signals, wherein the switching unit disconnects the power supply unit from the internal motor of the compressor in response to either one of the first and second power cutoff signals, and the switching unit connects the power supply unit to the internal motor of the compressor in response to either one of the first and second power supply signals.

7. The device of claim 6, wherein the switching unit, the internal triac, the compressor and the AC power are connected in series.

* * * * *